United States Patent [19]

Olson

[11] Patent Number: 5,297,270
[45] Date of Patent: Mar. 22, 1994

[54] PROGRAMMABLE CACHE MEMORY WHICH ASSOCIATES EACH SECTION OF MAIN MEMORY TO BE CACHED WITH A STATUS BIT WHICH ENABLES/DISABLES THE CACHING ACCESSIBILITY OF THE PARTICULAR SECTION, AND WITH THE CAPABILITY OF FUNCTIONING WITH MEMORY AREAS OF VARYING SIZE

[75] Inventor: Anthony M. Olson, Stevensville, Mich.

[73] Assignee: Zenith Data Systems Corporation, Buffalo Grove, Ill.

[21] Appl. No.: 17,972

[22] Filed: Feb. 12, 1993

Related U.S. Application Data

[63] Continuation of Ser. No. 435,320, Nov. 13, 1989, abandoned.

[51] Int. Cl.⁵ ............................................. G06F 13/00
[52] U.S. Cl. .................................... 395/425; 395/400; 364/DIG. 1; 364/243.41; 364/246.9
[58] Field of Search ........................... 395/400, 425; 369/700 MS File; 364/900 MS File

[56] References Cited

U.S. PATENT DOCUMENTS

| | | | |
|---|---|---|---|
| 4,794,521 | 12/1988 | Ziegler et al. | 364/200 |
| 4,794,523 | 12/1988 | Adan et al. | 364/200 |
| 4,797,813 | 1/1989 | Igarashi | 364/200 |
| 4,819,154 | 4/1989 | Stiffler et al. | 364/200 |
| 4,825,357 | 4/1989 | Ovies et al. | 364/200 |
| 4,953,073 | 8/1990 | Moussouris et al. | 364/200 |
| 5,008,813 | 4/1991 | Crane et al. | 364/200 |
| 5,091,846 | 2/1992 | Sachs et al. | 395/250 |

*Primary Examiner*—Joseph L. Dixon
*Assistant Examiner*—Frank J. Asta
*Attorney, Agent, or Firm*—Flynn, Thiel, Boutell & Tanis

[57] ABSTRACT

A system includes a main memory having a plurality of sections which each include a plurality of selectively addressable storage locations, a cache memory, and an accessing arrangement for successively requesting data from respective locations in the main memory. A method and apparatus for controlling the system involve assigning each section of the main memory a changeable status condition which is one of a caching enabled status and a caching disabled status, and inhibiting reading and storing of data by the cache memory when data requested by the accessing unit is in one of the sections of the main memory having the caching disabled status. An alternative method and apparatus for controlling the system involve selective operation in a mode in which data in the cache memory is updated even when reading of data from the cache memory is inhibited.

15 Claims, 4 Drawing Sheets

PROGRAMMABLE CACHE MEMORY WHICH ASSOCIATES EACH SECTION OF MAIN MEMORY TO BE CACHED WITH A STATUS BIT WHICH ENABLES/DISABLES THE CACHING ACCESSIBILITY OF THE PARTICULAR SECTION, AND WITH THE CAPABILITY OF FUNCTIONING WITH MEMORY AREAS OF VARYING SIZE

This application is a continuation of U.S. Ser. No. 07/435 320, filed Nov. 13, 1989, now abandoned.

FIELD OF THE INVENTION

The present invention relates to an improved control arrangement for a cache memory in a computer system and, more particularly, to a cache memory control system facilitating flexibility in defining the memory locations for which operation of the cache memory is and is not permitted, and facilitating updating of the data in the cache memory even when reading of data from the cache memory is inhibited.

BACKGROUND OF THE INVENTION

Modern computer systems have a main memory of semiconductor circuits which is large but relatively slow. Due to advances in technology, it is now possible to buy a central processing unit (CPU) which is significantly faster than the typical main memory. Consequently, significant inefficiency would result if the CPU had to stop and idle briefly during each memory access cycle while it waited for the memory. Although faster semiconductor memory components are available, they are significantly more expensive than slower components, and it is thus not cost effective to provide an entire main memory made from the faster memory components.

As a compromise, computer systems frequently include a cache memory which is made from the faster memory components and which is smaller than the main memory. When a data word is read from the main memory, a duplicate is stored in the cache memory, and if the CPU subsequently attempts to read the same data from the main memory, the cache memory will intervene and provide the data to the CPU much faster than the main memory could so that the CPU does not have to stop and wait. Usually, the entire cache memory can be enabled or disabled as a whole by the software.

Certain portions of a main memory can be separate conventional printed circuit cards which are plugged into connectors or slots provided in the computer. However, the same connectors or slots will accept other conventional circuit cards which in some respects appear to the CPU to be memory locations but which do not actually function as true memory locations. If a cache memory attempts to maintain a duplicate of data for such locations, errors will result. Although it is possible for software to attempt to keep track of these nonstandard locations and to turn off the cache memory when these locations are being accessed, the approach is cumbersome, not suitable for all applications, and requires additional processing by the CPU which reduces processing efficiency.

A further consideration is that, when a cache memory is turned off, updates of the data in it cease, and thus when the cache memory is again turned on it does not cause a noticeable system speed increase until a number of memory cycles have been performed and it again contains a useful quantity of up-to-date duplicate information.

It is therefore an object of the present invention to provide a control arrangement for a cache memory which facilitates flexibility in defining the memory addresses for which operation of the cache memory is and is not permitted.

A further object of the invention is to provide such a control arrangement which is relatively inexpensive, and which requires minimal additional hardware or software.

A further object is to provide a control arrangement for a cache memory which can operate the cache memory in a mode in which the transmission of data from the cache memory to the CPU can be inhibited while the cache memory nevertheless continues to be updated.

The objects and purposes of the invention, including those set forth above, are met by providing a method and apparatus involving a main memory having a plurality of sections which each include a plurality of selectively addressable storage locations, a cache memory, and an accessing arrangement for successively requesting data from respective locations in the main memory, each section of the main memory being associated with a changeable status condition which is one of a caching enabled status and a caching disabled status, and reading and storing of data by the cache memory is inhibited when data requested by the accessing unit is in one of the sections of the main memory having the caching disabled status.

The objects and purposes are also met by providing a method and apparatus in which the data in a cache memory can be updated even when reading of data from the cache memory is inhibited.

BRIEF DESCRIPTION OF THE DRAWINGS

A preferred embodiment of the present invention is described in detail hereinafter with reference to the accompanying drawings, in which.

DETAILED DESCRIPTION

Figure 1:
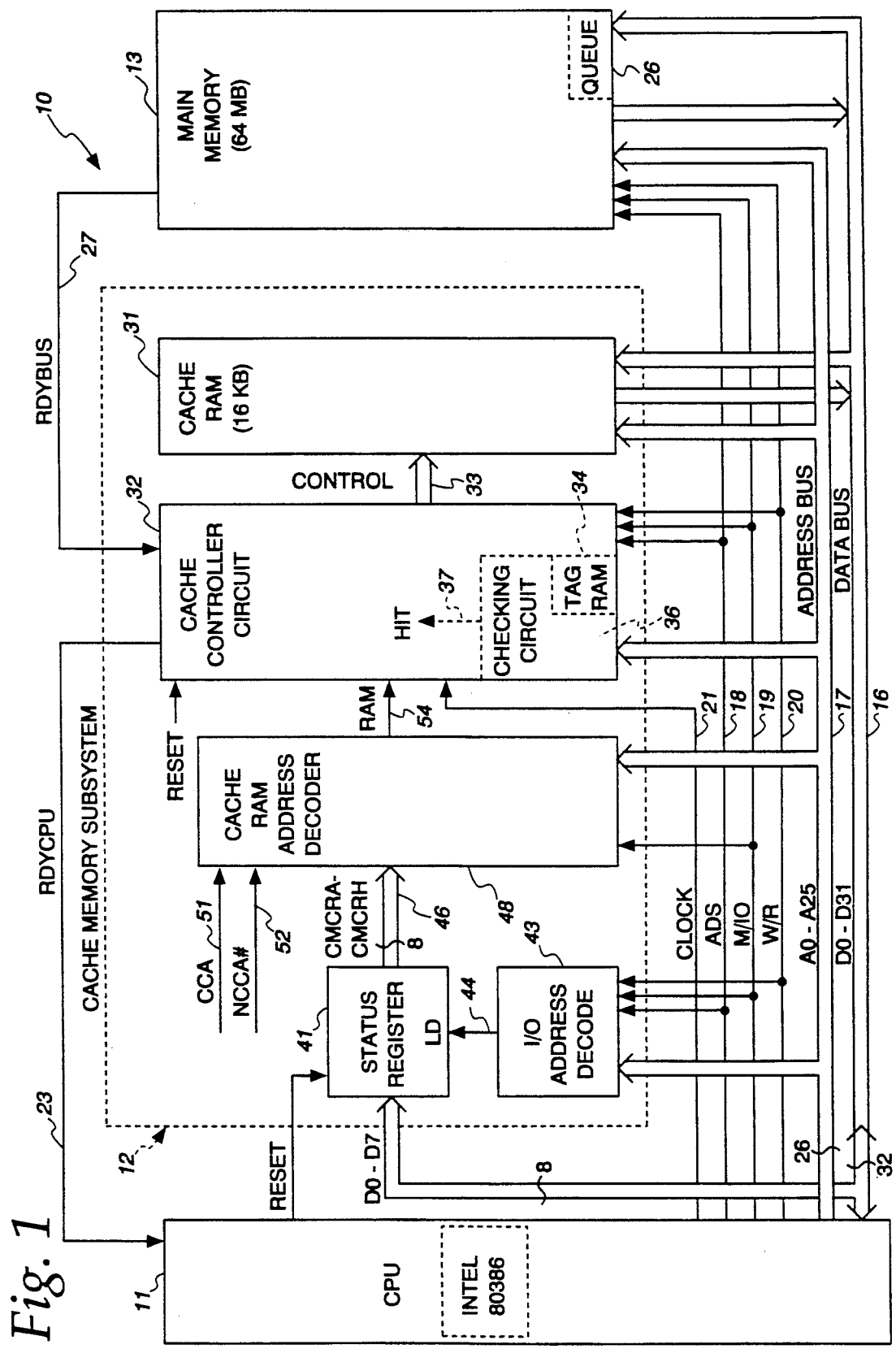
FIG. 1 is a block diagram of a computer system embodying the present invention.

FIG. 1 is a block diagram of a computer system 10 embodying the present invention. The computer system 10 includes a central processing unit (CPU) 11, a cache memory subsystem 12, and a main memory 13.

In the preferred embodiment, the CPU 11 is based on an Intel 80386, which is a conventional and commercially available microprocessor manufactured by Intel Corporation of Santa Clara, California. However, almost any other known central processing unit could be used.

Data is transferred to and from the CPU 11 across a 32-bit bidirectional data bus 16, the lines of which are labeled D0–DD31 in FIG. 1, where D0 is the least significant bit. The CPU 11 outputs memory and input- /output (I/0) addresses on a 26-bit address bus 17 having address lines labeled A0-A25 in FIG. 1, where A0 is the least significant bit. The CPU 11 produces a signal M/IO on a line 19 which is a logic high voltage when the address on the address bus 17 is a memory address and is a logic low voltage when the address on bus 17 is an I/0 address, and produces a signal W/R on line 20 which is a logic high voltage when the CPU 11 is writing data into another device and is a logic low voltage when the CPU is reading data from another device. The CPU 11 produces a signal ADS on line 18 to indicate that a valid address and valid control signals are present on lines 17, 19 and 20, thereby initiating a memory cycle or an input/output cycle. The CPU outputs a clock signal CLOCK on line 21, which other parts of the system can use to facilitate operation synchronously with the CPU. The CPU 11 receives from the cache memory subsystem 12 a signal RDYCPU on a line 23, the signal RDYCPU being discussed in more detail later.

The main memory 13 has a plurality of selectively addressable storage locations which each hold one byte, and in the preferred embodiment is a 64 MB (megabyte) memory. The CPU 11 is capable of reading and writing data significantly faster than the main memory 13 can accept data from or supply data to the CPU. For this reason, the main memory 13 includes a queue circuit 26, which is entirely conventional and not a part of the present invention. When the CPU 11 is writing data to the main memory 13, the queue circuit 26 accepts the data and then subsequently causes it to be written into the main memory 13 while the CPU 11 proceeds with other processing, which avoids the inefficiency of having the CPU 11 directly write the data into the main memory 13 and therefore sit idle while the main memory 13 slowly stores the data.

If the CPU 11 is reading data from the main memory 13, it has no choice but to wait until it actually receives the data, because it will invariably be necessary for the CPU processing which follows. The main memory 13 outputs a signal RDYBUS on line 27, and in particular activates this signal when data being read from the main memory 13 has been located by the main memory 13 and placed on the data bus 16, in order to signal the CPU 11 to proceed, which is effected in a manner described in more detail later.

In general terms, the cache memory subsystem 12 is smaller than but much faster than the main memory 13, and can store a duplicate of certain data from the main memory 13, in particular data which was recently read from the main memory 13 and which has an excellent statistical chance of being read again. When the CPU 11 subsequently attempts to read from the main memory 13 certain data which in fact is duplicated in the cache memory subsystem 12, the cache memory subsystem 12 will promptly supply that data to the CPU 11 much faster than it could be obtained from the larger main memory 13, so that the CPU 11 can resume its normal processing without sitting idle at all, thereby avoiding CPU inefficiency. Cache memory subsystems which perform the overall function just described are known. The present invention relates to an improved implementation of such a cache memory subsystem.

The cache memory subsystem 12 includes a cache random access memory (RAM) 31, which has a plurality of selectively addressable storage locations each holding one byte. In the preferred embodiment, the cache RAM 31 stores 16 KB (kilobytes). The lines of the address bus 17 are connected to the cache RAM 31, and select one of the storage locations therein. The cache RAM 31 receives data from and can place data onto the data bus 16. Each data byte stored in the cache RAM 31 is a duplicate of a data byte in the main memory 13, as mentioned above.

The cache memory subsystem 12 also includes a cache controller circuit 32, which produces control lines 33 to control reading and storing of data by the cache RAM 31, and which of course can inhibit reading and storing of data by the cache RAM 31. The cache controller circuit 32 includes a tag RAM 34, which stores information identifying each of the locations in the main memory 13 having data which is duplicated in the cache RAM 31. The cache controller circuit 32 includes a checking circuit 36, which compares the address present on address bus 17 with the information in tag RAM 34, and activates an internal signal HIT at 37 in the event the cache RAM 31 contains a duplicate of the data in the location of the main memory 13 which is selected by the address on the address bus 17. The tag RAM 34 and checking circuit 36 are conventional, and therefore not described in further detail here.

The cache memory subsystem 12 includes a status register 41, which holds a one byte status word. The data inputs of register 41 are connected to the eight lines D0-D7 of the data bus 16. An I/0 address decode circuit 43 has inputs connected to the address bus 17 and to control lines 18-20, and activates an output line 44 when it detects the presence of a predetermined address on the address bus 17 during an input/output write cycle, the output line 44 being connected to a load control input of the register 41 and activation thereof causing the byte on lines D0-D7 of the data bus 16 to be stored in the status register 41. In other words, the CPU 11 can selectively set the status register 41 to any desired condition by placing the byte to be loaded into the register 41 on the least significant bits of the data bus 16, by placing on the address bus 17 the specific address to which the decode circuit 43 is responsive, and by initiating an input/output write cycle.

The status register 41 has eight output lines labeled CMCRA through CMCRH, each of which is controlled by a respective one of the eight bits in the register 41. Each of the lines CMCRA-CMCRH corresponds to a respective section of the main memory 13, as shown in Table 1.

TABLE 1

| Status Line | MAIN MEMORY | |
|---|---|---|
| | Section | Address Range |
| CMCRA | A | 0 ≦ Address < 256K |
| CMCRB | B | 256K ≦ Address < 512K |
| CMCRC | C | 512K ≦ Address < 640K |
| CMCRD | D | 896K ≦ Address < 1M |
| CMCRE | E | 1M ≦ Address < 4M |
| CMCRF | F | 4M ≦ Address < 8M |
| CMCRG | G | 8M ≦ Address < 16M |
| CMCRH | H | 16M ≦ Address < 64M |

It should be noted that the eight sections of the main memory 13 are not of equal size, the largest (section H) containing slightly less than 200 times the number of locations present in each of the two smallest sections (sections A and B). In the preferred embodiment, a portion of the main memory (640K ≦ Address < 896K) is not assigned to any specific section. This is due to the fact that this portion of the memory receives special treatment from the operating system commonly known as DOS (disk operating system) and certain application programs, but it should be understood that it would be possible to section the main memory 13 in a manner so that every location therein is in a section corresponding to one of the status lines 46 from the register 41. It would even be possible to assign a particular location to more than one section.

For each of the status lines CMCRA through CMCRH, when the status line is set to a logic high voltage the cache memory subsystem 12 is enabled to store a duplicate of data words read from the corresponding section of the main memory 13 and is enabled to supply those duplicate words to the CPU 11 in the event the CPU 11 attempts to read them again from the main memory 13, whereas if the status line is set to a logic low voltage the cache memory subsystem 12 inhibits the cache RAM 31 from reading or writing data when the CPU 11 is accessing any location in the corresponding section of the main memory 13. More specifically, the cache memory subsystem 12 includes a cache RAM address decoder circuit 48 which has inputs connected to the eight status lines 46 from the register 41, to the lines of the address bus 17, to the M/IO control line 19, and to two external control signals CCA on line 51 and NCCA# on a line 52. (In this disclosure, the symbol # following a signal name means that the complement or inverse of the signal is being referred to). In essence, the decoder circuit 48 determines whether an address on the address bus 17 is selecting a location within one of the memory sections listed in the table above and, if so, checks the state of the status line 46 for that memory section to see whether operation of the cache memory subsystem 12 is to be enabled or disabled for that section. If operation is to be enabled, the decoder circuit 48 activates an output signal RAM on line 54, whereas if operation is not to be enabled the decoder circuit 48 does not activate the signal RAM on line 54. It should be noted that, if all eight bits of register 41 are set to a binary "0", the cache RAM 31 is completely disabled. In fact, as shown in FIG. 1, the system reset signal RESET is connected to the status register 41 and sets all eight bits to a binary "0" when system power is turned on, which permits the system program to carry out diagnostics on the RAM 31 before RAM 31 is actually used by any application program.

Figure 2:
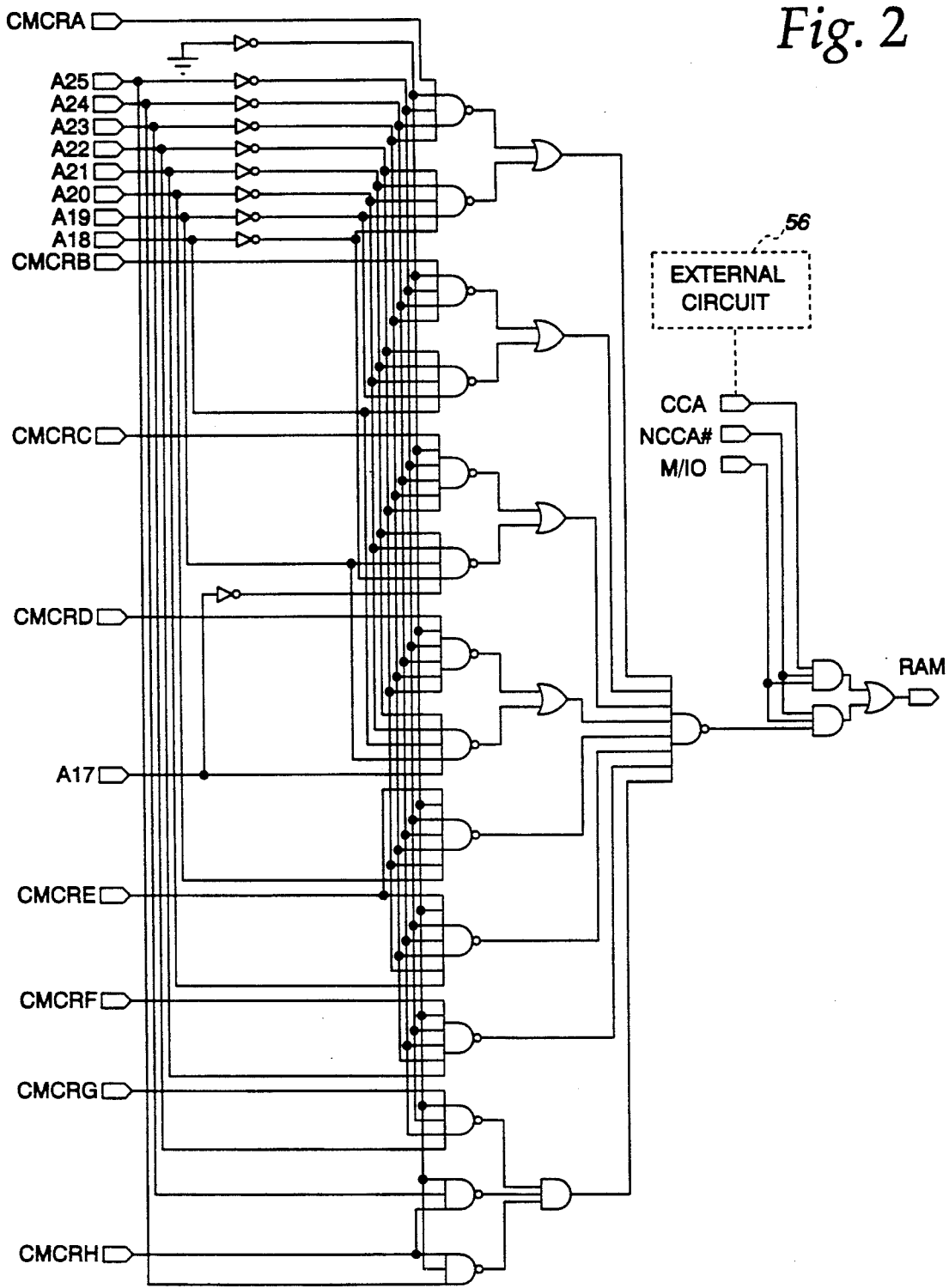
FIG. 2 is a schematic diagram of a circuit which is part of the computer system of FIG. 1.

The external signals CCA and NCCA# can optionally be controlled by an external circuit in order to vary the control function implemented by the decoder circuit 48 (for example the external circuit 56 in FIG. 2 which controls CCA). In particular, the signal CCA is normally a logic low voltage, but if an external circuit raises it to a logic high voltage during an input/output cycle, the decoder circuit 48 will activate the RAM signal on line 54 regardless of the state of the status lines 46 and the address which the decoder circuit 48 is receiving from the address bus 17. The signal NCCA# does just the opposite. In particular, the signal NCCA# is normally a logic high voltage, but if it is changed by an external circuit to a logic low voltage it unconditionally disables the decoder circuit 48 from activating the RAM signal on line 54 regardless of the states of all other inputs to the decoder circuit 48. Those of ordinary skill in the art will recognize that, by using only the two control signals CCA and NCCA# on lines 51 and 52, an external circuit can exercise total control over the RAM signal on line 54, and in particular can completely redefine the function implemented by the address decoder circuit 48. In the preferred embodiment, the signals CCA and NCCA# are normally maintained continuously at logic low and logic high voltages, respectively, and only if an optional external circuit is connected to them to control them do they change.

Those of ordinary skill in the art would know how to generate an appropriate address decoder circuit 48 to implement the function described above. Nevertheless, for purposes of completeness, an exemplary logic circuit suitable for use as the decoder circuit 48 of FIG. 1 is illustrated in FIG. 2, but a detailed discussion of the structure and operation of the circuit of FIG. 2 is omitted. If present, the external circuit 56 in FIG. 2 could, for example, respond to the application of power to the system by using CCA to force the signal RAM high, so that the entire memory 13 is treated as cachable regardless of the state of register 41.

Figure 3:
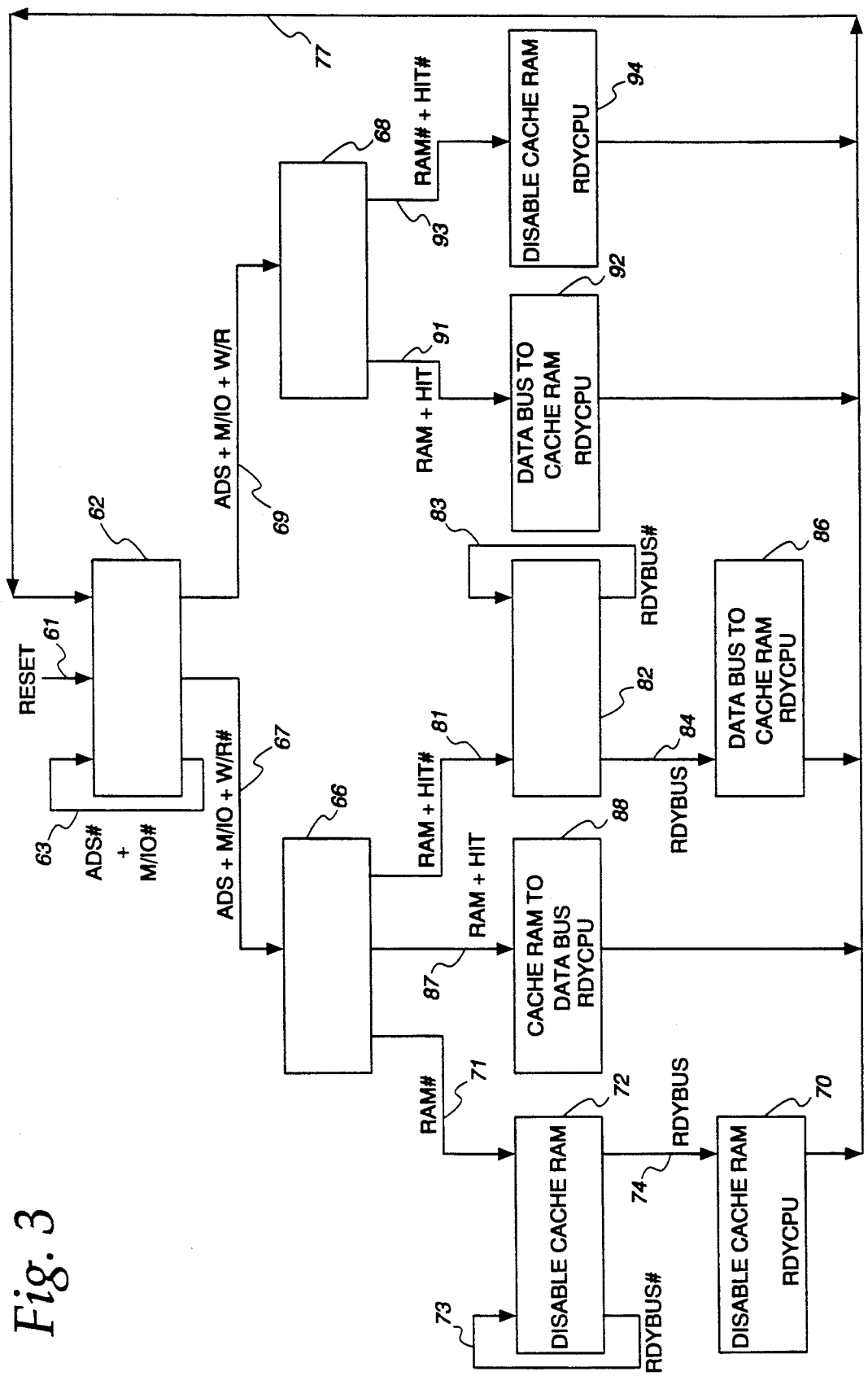
FIG. 3 is a state diagram depicting diagrammatically the operation of a controller circuit which is a component of the computer system of FIG. 1.

FIG. 3 is a state diagram showing diagrammatically the operation of the cache controller circuit 32 of FIG. 1. The state diagram of FIG. 3 is a simplified version of the actual state diagram for the preferred embodiment, the actual state diagram including additional operational states which are not pertinent to the subject matter of the present invention and which have therefore been omitted for clarity. In the preferred embodiment, transitions between states are effected in response to pulses of the signal CLOCK on line 21, so that the state machine of FIG. 3 is synchronized to the CPU.

Referring to FIG. 3, a system reset has the effect, as shown diagrammatically at 61, of forcing the controller circuit 32 into an initial state 62. As shown at 63, controller circuit 32 remains in state 62 so long as at least one of the signals ADS and M/IO on lines 18 and 19 in FIG. 1 is not activated, or in other words so long as the CPU 11 is not carrying out a memory cycle. When the CPU 11 does begin a memory cycle and simultaneously generates the signals ADS and M/IO, the controller circuit 32 will transition at 67 to a state 66 if the W/R signal on line 20 indicates that the memory cycle is a read, or will transition at 69 to a state 68 if the W/R signal indicates that the memory cycle is a write.

In state 66, the circuit 32 will check to see whether the decoder circuit 48 has activated the RAM signal on line 58 to indicate that the address on address bus 17 is in a section of the main memory 13 for which the corresponding bit in the status register 41 is set to a binary 1 to specify that the cache memory subsystem 12 is enabled for operation with respect to that memory section. If the RAM signal on line 54 is not activated, then the circuit 32 proceeds at 71 to state 72, where it sets control signals 33 to effectively disable cache RAM 31, and where it waits for the relatively slow main memory 13 to locate the data requested by the CPU 11, place the data on data bus 16, and activate the signal RDYBUS on line 27, in particular by repeatedly returning to state 72 as shown at 73 while the signal RDYBUS is not activated and then transitioning at 74 to state 76 in response to activation of the signal RDYBUS. In state 76, the controller circuit 32 continues generating control signals at 33 which effectively disable the cache RAM 31, while generating the signal RDYCPU on line 23 to indicate to the CPU 11 that the main memory 13 has placed the data requested by the CPU 11 on the data bus 16 and that the CPU 11 can thus take the data and continue with its processing. The controller circuit 32 then returns unconditionally at 77 to the initial state 62.

If the controller circuit 32 determines in state 66 that the RAM signal on line 54 has been activated by the decoder circuit 48, then the controller circuit 32 checks the state of the internal signal HIT on line 37 in order to see whether the cache RAM 31 already contains a duplicate of the data requested from the main memory 13 or whether a duplicate should now be stored in the cache RAM. Assuming that the signal HIT is not activated, meaning that the cache RAM 31 does not yet contain a duplicate of the data requested from the main memory 13, the controller circuit 32 transitions to a state 82, waits at 83 in state 82 for the signal RDYBUS from the main memory 13, and then proceeds at 84 to state 86, where it generates the signal RDYCPU on line 23 to the CPU 11 and where it generates control signals at 33 which cause the cache RAM 31 to store the data which the main memory 13 is sending across the data bus 16 to the CPU 11. The RDYCPU signal on line 23 causes the CPU 11 to accept the data sent by the main memory 13 across the data bus 16 and to proceed with its processing, while the controller circuit 32 transitions unconditionally at 77 to the initial state 62.

If it had been determined at state 66 that the RAM signal on line 54 and the HIT signal on line 37 were both activated, then it would mean that the cache memory subsystem 12 is enabled to operate with respect to the section of the main memory 13 containing the address specified by the CPU 11, and that the cache RAM 31 in fact already contains a duplicate of the data in that location. In this situation, the controller circuit 32 transitions at 87 from state 66 to state 88, where it generates control signals at 33 which cause the cache RAM 31 to place onto the data bus 16 the stored duplicate of the data being requested from the main memory 13, and also generates the signal RDYCPU on line 23 to tell the CPU 11 that the requested data is present on the data bus 16 and that the CPU 11 can accept the data and proceed with normal processing. Then, the controller circuit 32 transitions unconditionally at 77 back to initial state 62.

In the event the above-mentioned transition at 69 from state 62 to state 68 occurs because the CPU 11 is carrying out a memory write, the controller circuit 32 checks the state of the RAM signal on line 54 and the state of the HIT signal on line 37. If both signals are activated, then the cache memory subsystem 12 is enabled for operation with respect to the section of main memory 13 containing the location being written by the CPU 11, and in fact already contains a duplicate of the data present in that memory location. Obviously, in order to ensure that the duplicate data in the cache RAM 31 remains accurate, the new data which the CPU 11 is writing into the corresponding location of the main memory 13 must also be written into the cache RAM 31. Consequently, the controller circuit 32 transitions at 91 to a state 92, where it generates control signals at 33 which cause the data being sent from the CPU 11 to main memory 13 across data bus 16 to be written into the cache RAM 31. As discussed above, the CPU 11 does not wait while the main memory 13 carries out the relatively slow process of storing the data, but instead deposits the data in the queue circuit 26 and then proceeds with its processing while the queue circuit 26 supervises the storing of that data in the main memory 13. Consequently, in state 92 of the state diagram of FIG. 3, the controller circuit 32 does not wait for a RDYBUS signal on line 27 in a manner similar to that shown at 73 and 83 for states 72 and 82, but instead immediately and unconditionally generates the signal RDYCPU on line 23 in order to tell the CPU 11 that it can proceed with normal processing. Then, the controller circuit 32 transitions unconditionally at 77 to the initial state 62.

In state 68, if it is determined that the RAM signal on line 54 is not activated, then the cache memory subsystem 12 is not enabled for operation with respect to the section of memory containing the location into which the CPU 11 is writing data. Alternatively, if the HIT signal on line 37 is not activated, then the cache RAM 31 does not already contain a duplicate of the data in the location of the main memory 13 which the CPU 11 is changing. In either case, there is no need to update the cache RAM 31, and the controller circuit 32 therefore proceeds at 93 to state 94 where, as the CPU deposits the data into the queue circuit 26, the controller circuit 32 generates control signals at 33 which inhibit the cache RAM 31 from accepting any data from or supplying any data to the data bus 16, and where it generates the signal RDYCPU on line 23 to tell the CPU 11 to proceed with its processing. The controller circuit 32 then transitions unconditionally at 77 from state 94 to the initial state 62.

Those of ordinary skill in the art are thoroughly familiar with state diagrams of the type shown in Figure 3 and with the techniques for generating from a state diagram a logic circuit which implements the state diagram. For example, these techniques are discussed in the book "Switching and Finite Automata Theory" written by Zvi Kohavi of the Massachusetts Institute of Technology and published in 1970 by McGraw-Hill Book Company of New York. Accordingly, a detailed circuit schematic corresponding to the state diagram is believed unnecessary here and has been omitted.

Figure 4:
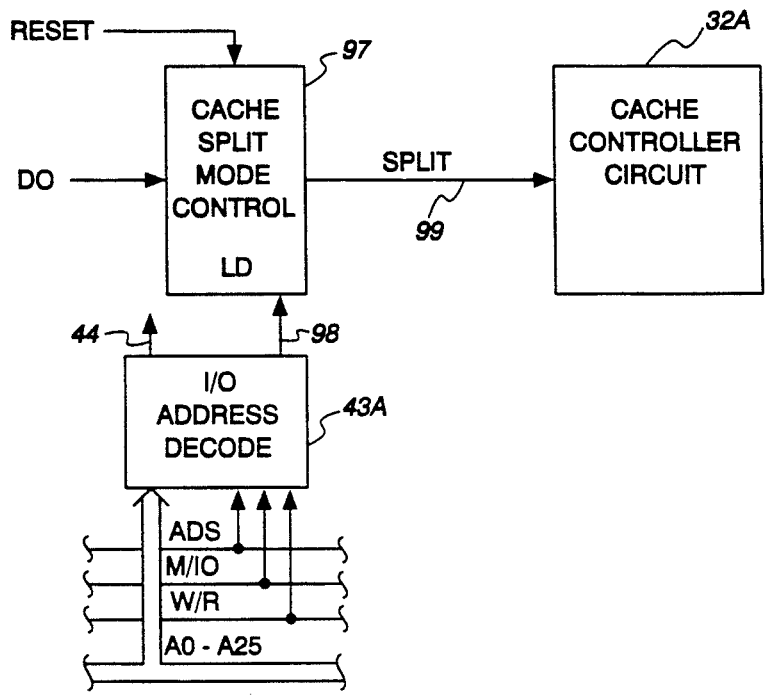
FIG. 4 is a partial block diagram similar to a portion of FIG. 1 showing a modification to the embodiment of FIG. 1.
Figure 5:
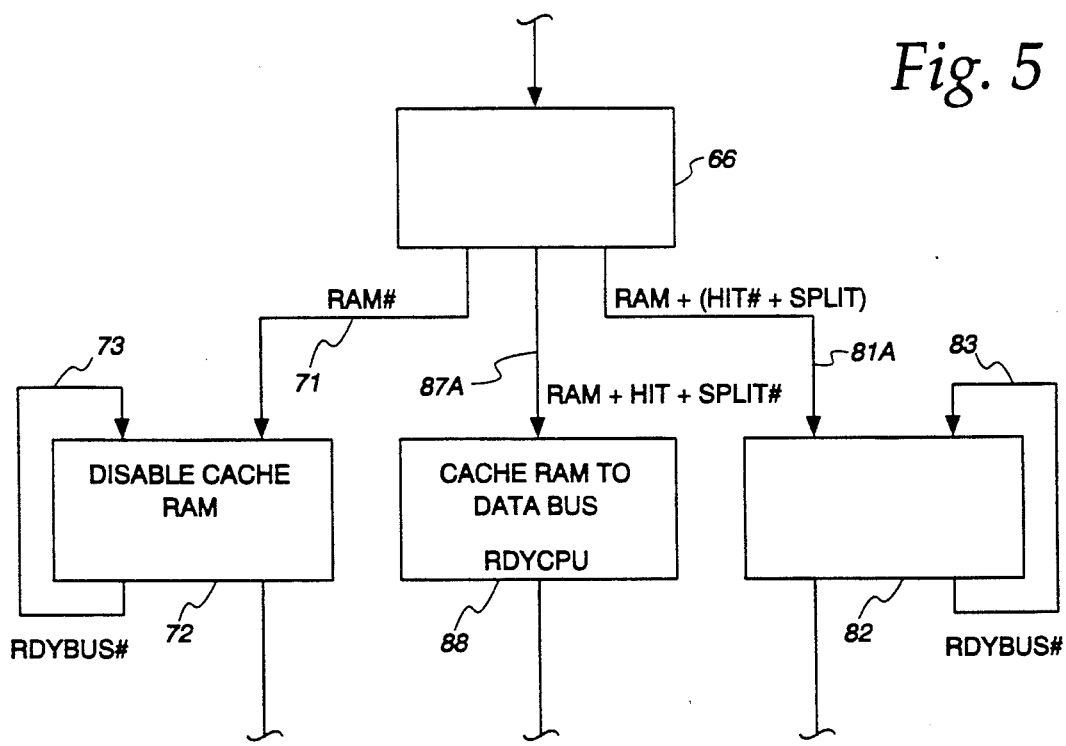
FIG. 5 is a partial state diagram similar to a portion of FIG. 3 which depicts diagrammatically the operation of the modified embodiment shown in FIG. 4.

Turning to the alternative embodiment shown in FIGS. 4 and 5, FIG. 4 shows a modification to the block diagram of FIG. 1. In particular, FIG. 4 includes an I/0 address decode circuit 43A which is identical to the circuit 43 of FIG. 1 except that, in addition to the output line 44, it produces a similar additional output line 98 in response to a different input/output address. FIG. 4 also includes an additional register 97, which is a one-bit cache split mode control register having a data input coupled to line D0 of the data bus, a load control input controlled by the line 98 from circuit 43A, a reset input to which is applied the system reset signal RESET, and an output producing a signal SPLIT on a line 99 which is connected to an input of a cache controller circuit 32A, the circuit 32A being identical to the circuit 32 of FIG. 1 except for the differences described below.

The register 97 is normally reset by the signal RESET following power-up, so that the output signal SPLIT is a logic low voltage. During normal operation, the signal SPLIT will be maintained at a logic low voltage. When the signal SPLIT is at a logic low voltage, the cache controller circuit 32A will operate in exactly the same manner as the circuit 32 described above in association with the embodiment of FIG. 1. However, if the single bit in register 97 is set by the CPU 11 to a binary "1" in order to set the signal SPLIT to a logic high voltage, the cache controller circuit 32A will cause the system to operate in a special split mode, in which the cache RAM 31 is updated in precisely the same manner as in the embodiment of FIG. 1, but in which data is never read out of the cache RAM 31 so long as the SPLIT mode is in effect. Thus, whenever the CPU 11 attempts to read data from the main memory 13 when the SPLIT mode is in effect, the cache RAM 31 will never output data even if it in fact contains a duplicate, and the data will always be obtained from the main memory 13. Nevertheless, updates to the cache RAM are performed so that, as soon as the CPU 11 loads the register 97 in FIG. 4 with a binary "0" in order to disable the SPLIT mode, the cache RAM 31 will be completely up-to-date and will be able to immediately supply to the CPU 11 accurate data for every address as to which it is maintaining a duplicate of the data in main memory 13.

FIG. 5 shows a portion of the state diagram for the controller circuit 32A of FIG. 4, the state diagram for the circuit 32A being identical to the state diagram shown in FIG. 3 except for the differences specifically described below in association with Figure 5. In particular, the only differences are that the transitions from block 66 to blocks 82 and 88 occur at 81A and 87A in response to conditions which take into account the output signal SPLIT from the register 97. More specifically, block 88 is the block where duplicate data from the cache RAM is supplied to the CPU 11, and a transition from block 66 to block 88 at 87A requires not only that the signals RAM and HIT be activated, but also that the signal SPLIT be deactivated. If the signal SPLIT is activated to indicate that no duplicate data from the cache RAM is to be sent to the CPU 11, then the transition at 87A to block 88 does not occur. Instead, and assuming the signal RAM is activated, control will transition at 81A to block 82 so that, as described previously with respect to blocks 82 and 86, the CPU 11 receives data directly from the main memory 13 and the data which the CPU 11 receives from the main memory 13 is loaded into the cache RAM 31 in order to provide in cache RAM 31 an up-to-date duplicate of the data read from the main memory 13.

Although a preferred embodiment of the present invention has been disclosed in detail for illustrative purposes, it will be recognized that there are variations or modifications thereof, including the rearrangement of parts, which lie within the scope of the present invention.

The embodiments of the invention in which an exclusive property or privilege is claimed are defined as follows:

1. An apparatus comprising: a main memory having a plurality of sections which each include a plurality of selectively addressable storage locations; selectively settable status means for specifying for each said section of said main memory a status which is one of a caching enabled status and a caching disabled status; accessing means for successively requesting data from respective said storage locations in said main memory; a cache memory; and cache control means responsive to said selectively settable status means for inhibiting reading and storing of data by said cache memory when the requested data is in one of said sections of said main memory having said caching disabled status; wherein said cache control means is responsive to a request by said accessing means for data in a location of said main memory for storing in said cache memory a duplicate of the requested data from said main memory when said cache memory lacks a duplicate of the requested data and the requested data is in one of said sections of said main memory having si caching enabled status and for supplying the requested data to said accessing means when the requested data has previously been stored in said cache memory and is in one of said sections of said main memory having said caching enabled status; wherein said selectively settable status means includes a register having a number of bits equal to the number of sections of said main memory and includes means responsive to said accessing means for causing said register to be loaded with data supplied by said accessing means, each said bit of said register corresponding to a respective one of said sections of said main memory and being respectively in a first logical state and a second logical state to indicate that such section has said caching enabled status and caching disabled status, respectively; and wherein said selectively settable status means includes decoder circuit means responsive to said register and to an address from said accessing means for producing an output signal which is activated and deactivated when an address from said accessing means is within one of said sections of said memory designated by said status means as having said caching enabled status and caching disabled status, respectively, said output signal from said decoder circuit being supplied to said cache control means.

2. An apparatus as recited in claim 1, wherein the number of storage locations in a first of said sections of said main memory is different from the number of storage locations in a second of said sections of said main memory.

3. An apparatus as recited in claim 1, including means responsive to system power being turned on for setting each said bit of said register to said second logical state.

4. An apparatus as recited in claim 1, wherein said decoder circuit has a first external control terminal and a second external control terminal, wherein said decoder circuit activates said output signal thereof in response to the application of a control signal to said first external control terminal, and deactivates said output signal thereof in response to application of a control signal to said second external control terminal.

5. An apparatus as recited in claim 4, including circuit means coupled to said first external control terminal for applying a control signal thereto in response to system power being turned on.

6. An apparatus comprising: a main memory having a plurality of selectively addressable storage locations; accessing means for successively requesting data from respective said storage locations in said main memory; a cache memory; and cache control means for operating said cache memory in a selected one of a first mode and a second mode, wherein in said first mode said cache control means is responsive to a request by said accessing means for data in a location of said main memory for storing in said cache memory a duplicate of the requested data from said main memory when said cache memory lacks a duplicate of the requested data and for supplying from said cache memory to said accessing means a duplicate of the requested data when said cache memory contains a duplicate of the requested data, and wherein in said second mode said cache control means is responsive to a request by said accessing means for data in a location of said main memory for storing in said cache memory a duplicate of the requested data from said main memory when said cache memory lacks a duplicate of the requested data and for preventing said cache memory from supplying data to said accessing means when said cache memory contains a duplicate of the requested data.

7. An apparatus as recited in claim 6, wherein said main memory has a plurality of sections which each include a plurality of said selectively addressable storage locations; and including selectively settable status means coupled to said cache control means for specifying for each said section of said main memory a status which is one of a caching enabled status nd a caching disabled status; said cache control means being responsive to a request by said accessing means for data in a location of said main memory for storing in said cache memory a duplicate of the requested data from said main memory when said cache memory lacks a duplicate of the requested data and when the requested data is in one of said sections of said main memory for which said selectively settable status means is specifying caching enabled status, for supplying from said cache memory to said accessing means a duplicate of the requested data when said cache memory contains a duplicate of the requested data, when said cache memory is being operated in said first mode, and when the requested data is in one of said sections of said main memory having said caching enabled status, for preventing said cache memory from supplying data to said accessing means when said cache memory lacks a duplicate of the requested data, for preventing said cache memory from supplying data to said accessing means when said cache memory is being operated in said second mode, and for preventing said cache memory from supplying data to said accessing means when the requested data is in one of said sections of said main memory having said caching disabled status.

8. An apparatus as recited in claim 7, wherein the number of storage locations in a first of said sections of said main memory is different from the number of storage locations in a second of said sections of said main memory.

9. An apparatus as recited in claim 6, wherein said accessing means includes means for outputting data to said main memory for storage in one of said storage locations thereof, and wherein in each of said first and second modes said cache control means is responsive to said accessing means outputting data to said main memory for storing in said cache memory a duplicate of the data output by said accessing means to said main memory.

10. An apparatus as recited in claim 6, wherein said cache control means includes means for operating said cache memory in a third mode in which said cache memory is prevented from storing data supplied by said main memory to said accessing means when said cache memory lacks a duplicate of the requested data nd for preventing said cache memory from supplying data to said accessing means when said cache memory contains a duplicate of the requested data.

11. An apparatus comprising: a main memory having a plurality of sections which each include a plurality of selectively addressable storage locations; selectively settable status means for specifying for each said section of said main memory a status which is one of a caching enabled status and a caching disabled status; external input means for selectively specifying one of a caching enabled status and a caching disabled status; accessing means for successively requesting data from respective said storage locations in said main memory; a cache memory; and cache control means for inhibiting reading and storing of data by said cache memory when the requested data is in one of said sections of said main memory for which said selectively settable status means is specifying said caching disabled status, for inhibiting reading and storing of data by said cache memory when said external input means is specifying said caching disabled status, for responding to a request by said accessing means for data in a location of said main memory when said cache memory lacks a duplicate of the requested data by storing in said cache memory a duplicate of the requested data from said main memory when said external input means is specifying caching enabled status for the location and by storing in said cache memory a duplicate of the requested data from said main memory when said selectively settable status means is specifying caching enabled status for the location and said external input means is not specifying caching disabled status, for responding to a request by said accessing means for data in a location of said main memory which has previously been stored in said cache memory by supplying the requested data to said accessing means when said external input means is specifying caching enabled status for the location, and by supplying the requested data to said accessing means when said selectively settable status means is specifying caching enabled status and said external input means is not specifying caching disabled status.

12. An apparatus as recited in claim 11, wherein said external input means includes first and second external control terminals, said external input means specifying said caching enabled status in response to the application of a control signal to said first external control terminal and specifying said caching disabled status in response to the application of a control signal to said second external control terminal.

13. An apparatus as recited in claim 11, including a selectively actuable mode control element, said cache control means being responsive to actuation of said mode control element for inhibiting said cache memory from supplying the requested data to said accessing means regardless of the caching status specified by each of said external input means and said selectively settable status means, and being responsive to said mode control element being deactuated when said accessing means requests data in a location of said main memory which was previously stored in said cache memory for supplying the requested data to said accessing means when said external input means is specifying caching enabled status for the location and for supplying the requested data to said accessing means when said selectively settable status means is specifying caching enabled status for the location and said external input means is not specifying caching disabled status.

14. An apparatus, comprising: A main memory having a plurality of selectively addressable storage locations; accessing means for successively requesting data from respective said storage locations in said main memory; a cache memory; and cache control means for operating said cache memory in a predetermined operational mode in which said cache control means is responsive to a request by said accessing means for data in a location of said main memory for storing in said cache memory a duplicate of the requested data from said main memory when said cache memory lacks a duplicate of the requested data and for preventing said cache memory from supplying data to said accessing means when said cache memory contains a duplicate of the requested data.

15. A method for controlling an apparatus which includes a main memory having a plurality of selectively addressable storage locations; a cache memory, and accessing means for successively requesting data from respective said storage locations in said main memory, comprising the steps of: selecting one of a first operational mode and a second operational mode; storing in said cache memory a duplicate of the requested data from said main memory when said cache memory lacks a duplicate of the requested data in each of said first operational mode and said second operational mode; supplying from said cache memory to said accessing means a duplicate of the requested data when said cache memory contains a duplicate of the requested data in said first operational mode; and preventing said cache memory from supplying data to said accessing means when said cache memory contains a duplicate of the requested data in said second operational mode.

* * * * *